May 14, 1968
R. S. HELM
3,383,266
METHOD AND APPARATUS FOR MANUFACTURING FIBER
REINFORCED PLASTIC SHEETS
Filed Jan. 25, 1963
3 Sheets-Sheet 1
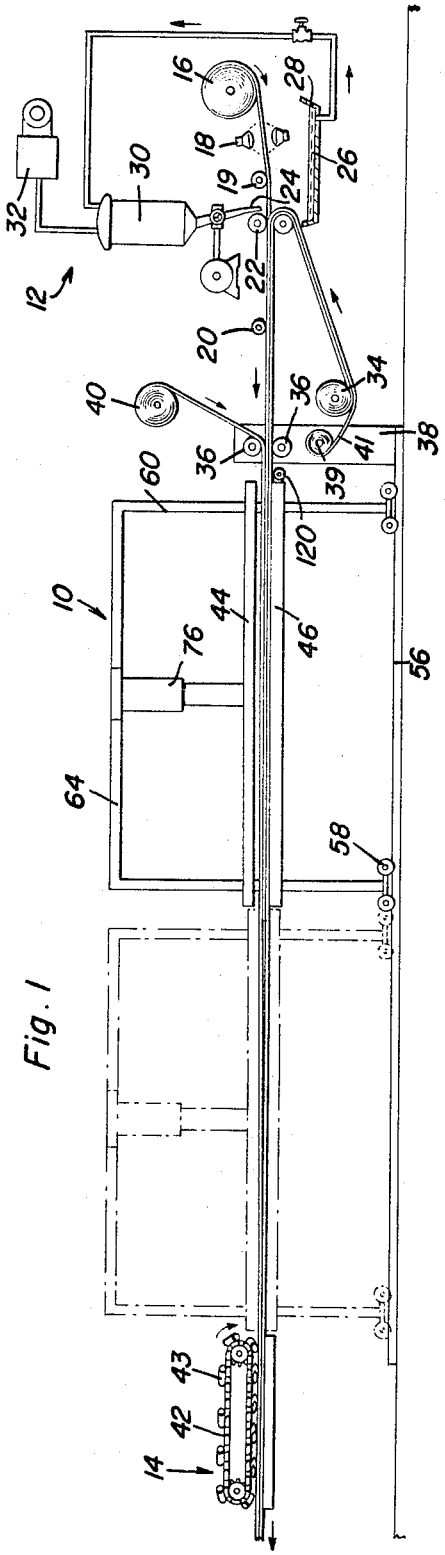
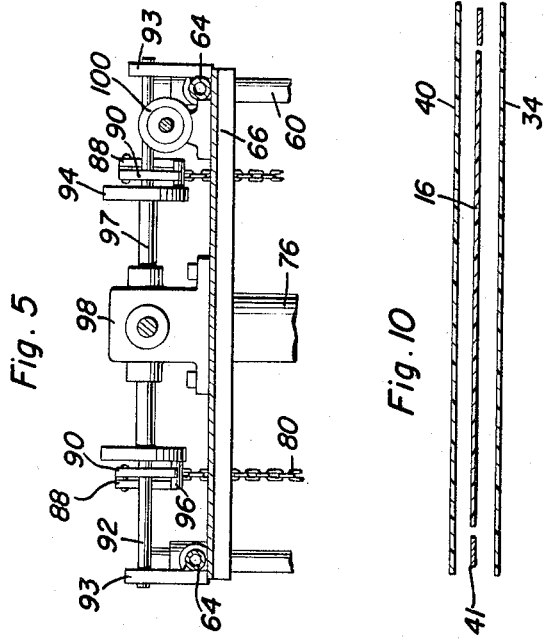
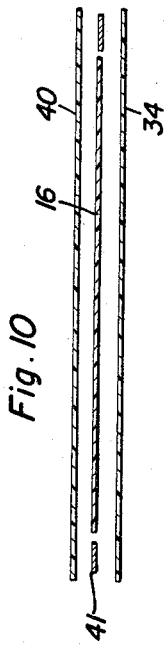
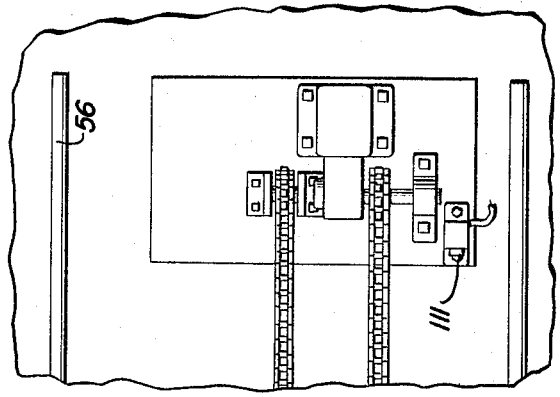
Roy S. Helm
INVENTOR.
BY Clarence A. O'Brien
and Harvey B. Jacobson
Attorneys

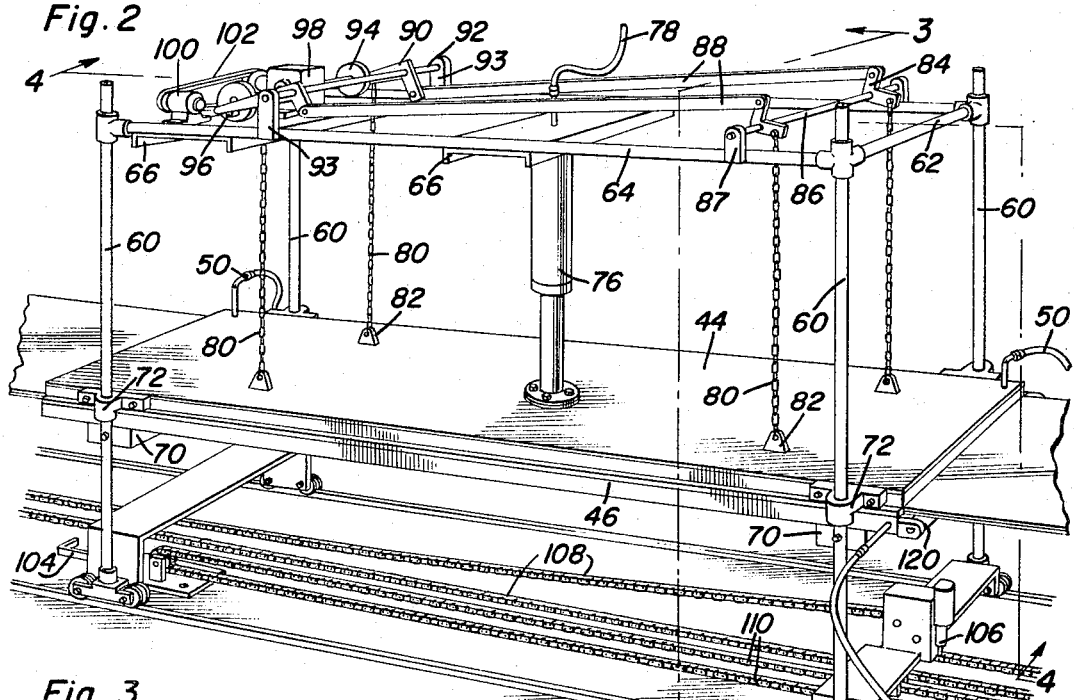
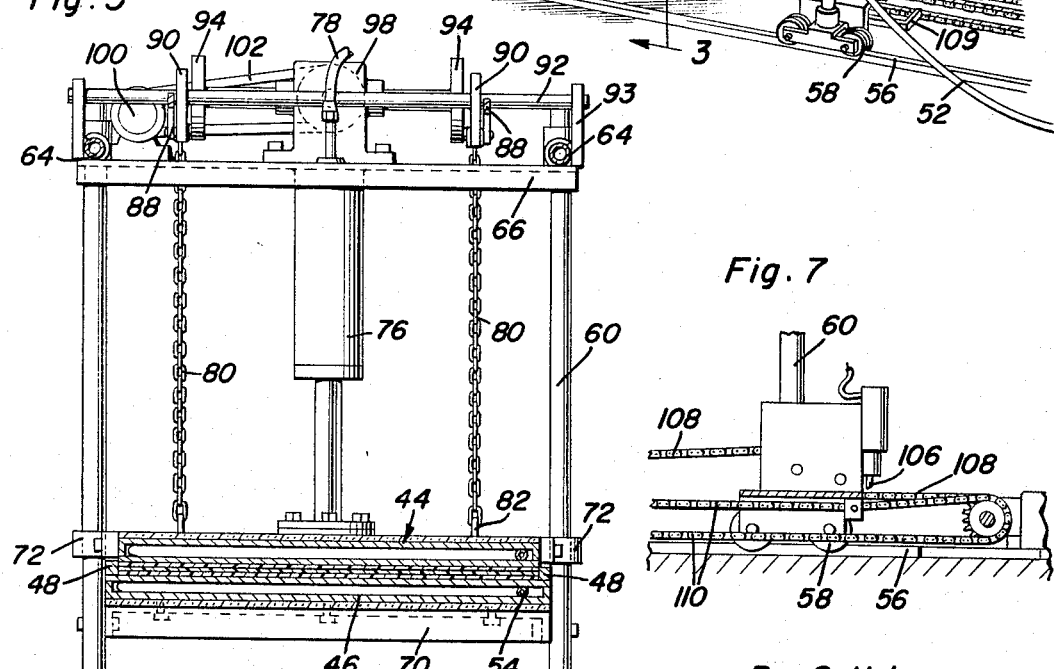
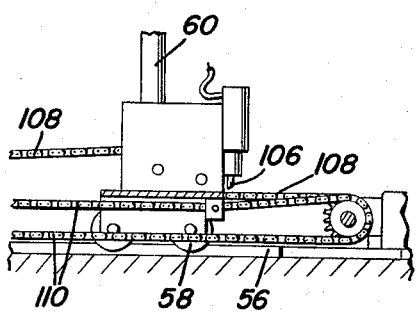
Roy S. Helm
INVENTOR.

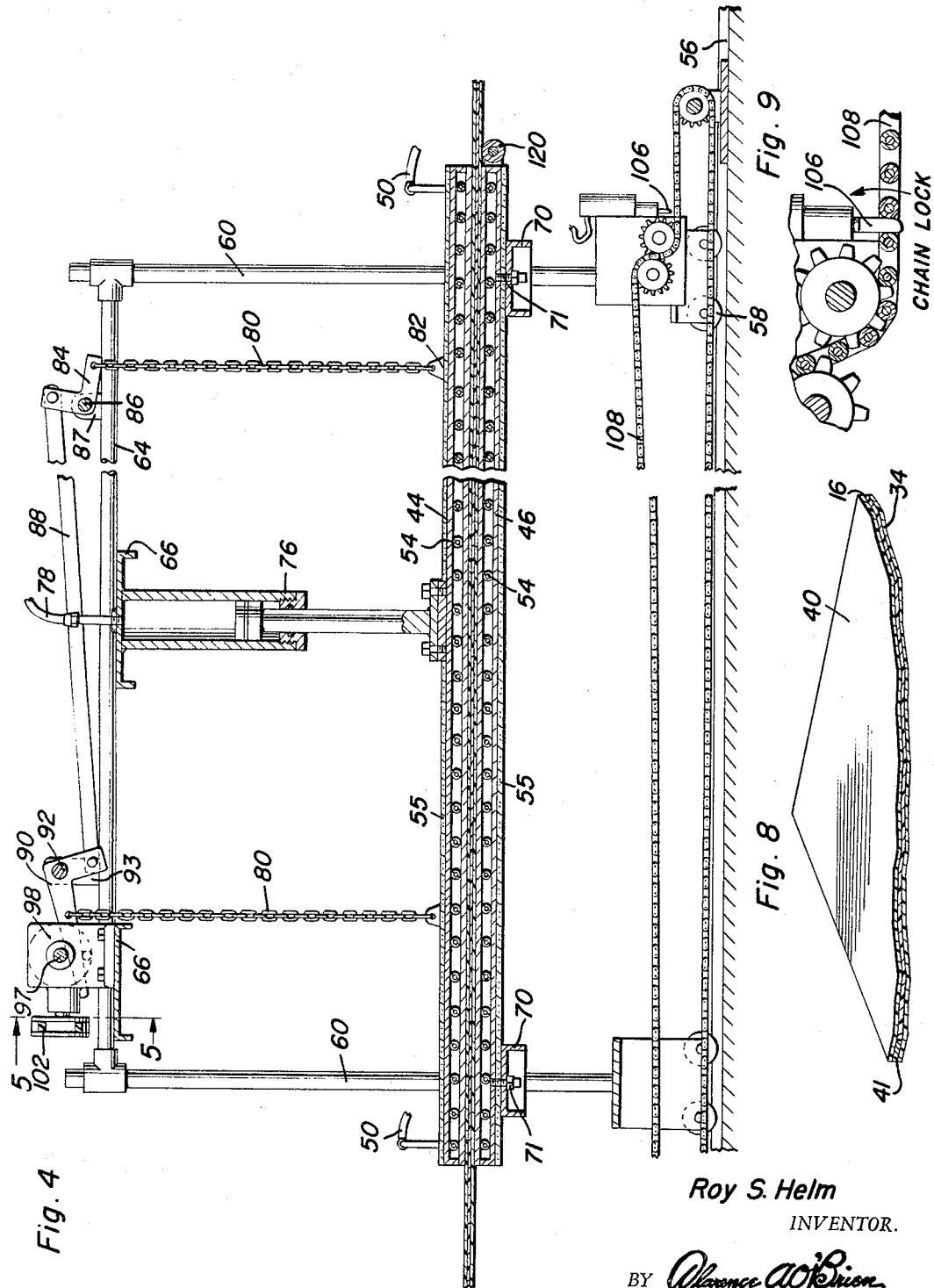

United States Patent Office 3,383,266
Patented May 14, 1968

3,383,266
METHOD AND APPARATUS FOR MANUFAC-
TURING FIBER REINFORCED PLASTIC
SHEETS
Roy S. Helm, Rte. 2, Kennett Square, Pa. 19348
Filed Jan. 25, 1963, Ser. No. 253,829
2 Claims. (Cl. 156—313)

ABSTRACT OF THE DISCLOSURE

A molding apparatus for forming a continuous laminated sheet in which increments of the continuous length of the laminated sheet will be sequentially molded by a traveling molding apparatus so constructed and arranged that the molding operation will be completed during the movement of the molding apparatus during one-half of each cycle of movement with the return cycle of movement being shorter than the molding cycle thereof. The unmolded laminate sheet is formed by a method and apparatus for thorough impregnation of the resin with a glass fiber mat together with application of cover sheets or film on the top and bottom surfaces thereof. A support panel is provided on the molding apparatus to support the unmolded laminate sheet during movement of the molding, apparatus during the molding portion of its cycle of movement.

The present invention generally relates to a novel apparatus and method for producing plastic sheets reinforced with glass fiber or the like whereby such sheets may be molded in lengths with accurately controlled thickness and by employing a minimum of labor thereby reducing the cost of such sheets and enabling the apparatus and process to be economically employed.

A further object of the invention is to provide a method and apparatus for manufacturing fiber reinforced plastic sheets incorporating a movable mold or press which receives the material therebetween and which moves at a predetermined rate of travel so that when the mold reaches one end of its travel, it will have molded a sheet of plastic material whereupon the mold then releases the molded sheet and returns to an initial starting position and subsequently engages another increment of the material therein for forming the sheets in a step-by-step manner with the mold moving with the sheet during the molding operation and then rapidly returning to a starting position for molding a second increment of the sheet.

Still another object of the invention is to provide an arrangement in which the supporting frames support two supply rolls of material such as cellophane or the like in which a bottom ply of this material serves as a support for the wet glass mat as it approaches a pair of squeeze rolls. At this point, the top ply contacts the wet glass mat as it passes through the squeeze rolls thereby providing a sandwich that is supported by a heavy sheet of canvas having one end fastened to the framework which supports the squeeze rolls and unwinding from a curtain-type spring roll fastened to the movable press or mold.

Still another object of the present invention is to provide a method and apparatus for forming laminated fiber reinforced plastic sheets which is simple in construction, easy to use, relatively inexpensive and efficient in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a schematic side elevational view of the structure for forming the reinforced fiber plastic sheets;
FIGURE 2 is a perspective view of the press or mold;
FIGURE 3 is a transverse, sectional view taken substantially upon a plane passing along section line 3—3 of FIGURE 2;
FIGURE 4 is a longitudinal, sectional view taken substantially upon a plane passing along section line 4—4 of FIGURE 2 illustrating further structural details of the mold or press;
FIGURE 5 is a detailed sectional view taken substantially upon a plane passing along section line 5—5 of FIGURE 4 illustrating further structural details of the drive mechanism for controlling the position of the press;
FIGURE 6 is a detailed plan view of the drive mechanism for the press;
FIGURE 7 is a side elevational view of the construction for controlling the press;
FIGURE 8 is a fragmental perspective view of the plastic sheet formed by the present invention;
FIGURE 9 is a detailed sectional view illustrating the chain lock mechanism; and
FIGURE 10 is a sectional view of the laminated molded sheet.

Referring now specifically to the drawings, the present invention incorporates a mobile press or mold generally designated by the numeral 10 and the supply apparatus generally designated by the numeral 12 and a removal apparatus generally designated by the numeral 14. The supply includes a supply roll 16 of fiber glass mat which is passed between heating lamps 18 of any suitable construction with the temperature of the glass mat being raised to at least 220° F. before passing under a guide roller 19 and screened rollers 20 and 22 during which resin will be discharged onto the glass mat by a suitable nozzle 24. The heat lamps will assure that all moisture has been removed from the mat and also will improve "wetting" of the glass mat by the resin. As the mat is permeated by the liquid resin, the heated air pockets therein will cool thus tending to draw or suck the resin into the small air spaces trapped in the mat. The location of screen roller 20 serves as a secondary control of air removal and resin to glass ratio. Impregnation of the mat is carried out by a continuous flow of an evacuated liquid thermosetting resin which saturates the glass mat. The liquid resin is fed through a horizontal pipe or nozzle 24 which runs parallel to and adjacent to wire screened or grooved rolls 20 and 22. Underlying the roll 22 is a similar roll and the resin forms a bead between the two rolls thus impregnating the glass mat as it passes between them thereby allowing air bubbles to escape between the wire mesh screen or grooves of the roll. Excess resin 26 runs into a trough 28 disposed therebelow and is recycled into the resin tank 30. A vacuum pump 32 is communicated with the resin tank 30 to eliminate as many air bubbles as possible from the resin.

A cellophane supply roll 34 is supported by a suitable bracket arrangement and extends under the bottom of the roller 22 thus supporting the resin wet glass mat as it is discharged from the screen rollers to a pair of squeeze rollers 36 which are supported on a suitable framework 38. Thus, the cellophane forms a bottom ply for the glass mat and forms a support for the glass mat as it approaches the squeeze roll 36. A distance on the order of 18 inches or more is generally sufficient between the wire screen rolls 22 and the squeeze rolls 36 to allow thorough wetting of the glass fibers. If any dry areas are noted on the wet mat during this period, additional resin can be added during the stage if desired. A top cellophane supply roll 40 is provided for supplying a top ply of cellophane under the top squeeze roll 36 thus forming a top ply with the glass mat 16 being received between the bottom ply 34 and the top ply 40.

Any non-porous plastic film such as polyethylene cellophane or polyester film can be used for the top and bottom ply in making the "sandwich" of glass reinforced resin sheet. The squeeze rolls 36 are adjustable so that the thickness of the laminated sheet may be varied. Also, both the bottom and top plies of film, such as cellophane are wider than the glass' mat by approximately two inches on either side. This allows sufficient space on each side for a strip of paper base material 41 fed from free spool rolls 39 mounted on frame 38 adjacent squeeze rolls 36. The ½ inch paper strip 41 runs between the edges of the two plies of cellophane and alongside the edges of mat 16. The end of the strip 41 is taped to the bottom ply 34 before impregnation is started. It is sandwiched between the cellophane and also prevents air from entering the sheet. The squeeze rolls serve to remove air bubbles and initially control the thickness as well as control the resin to glass ratio.

In threading the cellophane into the apparatus, the two plies of cellophane are pulled through the squeeze rolls, through the open mold 10 and between a table and a vertically adjustable cletrac-type mechanism carried by a frame and which engages the cellophane and the molded sheet to maintain a constant tension to pull the sheets through the mold. The removal assembly which includes a hard rubber belting 42 driven by a suitable variable speed motor synchronized with the speed of impregnation or with the forwardly moving press or mold 10. Enough tension is provided to pull the entire impregnated sheet through the squeeze rolls. At the start of the operation, it is necessary to place between the threaded cellophane a previously molded sheet which is long enough to contact the cletrac and the first section of molded sheet as it emerges from the mold. The frame is mounted in any suitable manner and almost contacts the press after its maximum travel from the treating table. Two stationary saws (not shown) are mounted on the cletrac width. A third saw (not shown) is mounted on a frame in back of the cletrac mechanism which may be employed to make a crosscut wherever desired.

The movable mold includes two hollow metal platens 44 and 46 which may be approximately 10 to 12 feet long and approximately 44 inches wide in order to provide a 42 inch molding surface. A one inch wide rail 48 is provided on the bottom platen 46 for controlling the thickness of the molded sheet by limiting the degree of compression of the molded sheet by the platens. The top and bottom platens 44 and 46 are heated with hot water supplied by circulation hoses 50 and 52 respectively with the hot water maintaining the platens at approximately 200° F. by virtue of circulation of hot water from a central hot water system (not shown). Metal tubing heating coils 54 are employed in conjunction with the platens to circulate water therethrough for transfer of heat thereto. Thus, direct metal contact of the platen with the impregnated sheet provides faster molding cycles. The area above the heating coils 54 of the top platen 44 and below the heating coils 54 of the bottom platen 46 is insulated at 55 to prevent heat loss.

The press 10 is mounted on a pair of parallel rails 56 for supporting grooved wheels 58 carried by the lower ends of upright corner posts or frame members 60 which cooperate with top end rails 62 and side rails 64 to form a rigid frame. A pair of inverted channel-shaped connecting members 66 extend between rails 64 for rigidifying the frame and horizontal transverse support members 70 extend between posts 60 and bolt-type fasteners 71 secures the lower platen 46 thereto for stationarily mounting the lower platen on the posts 60. The upper platen 44 is provided with a guide sleeve 72 at each corner thereof slidably engaging the posts 60 thereby enabling reciprocation of the upper or top platen 44.

A hydraulic piston and cylinder assembly or ram 76 is rigidly connected to the center portion of the upper platen 44 and to one of the cross members 66. A hose 78 extends to a suitable hydraulic pump or the like for supplying hydraulic fluid pressure to the hydraulic ram or jack 76 for exerting downward pressure on the top platen. A suitable control valve is provided for admitting and exhausting fluid pressure. Also, a plurality of chains 80 are connected to the top platen 44 by attaching lugs 82. The upper end of each chain of one pair of chains 80 is connected to one arm of a bell crank 84 carried by a transverse rotatable shaft 86 mounted on lugs 87 on side rails 64. The other arm of each bell crank 84 is connected to a connecting rod or strap 88 which extends longitudinally and is connected to the short arm of an L-shaped arm 90. A rotatable horizontal shaft 92 parallel to the shaft 86 is mounted on lugs 93 on rails 64. The free ends of the long arm of the L-shaped arms 90 are generally tapered as illustrated in FIGURE 2 and are engaged with cam wheels 94 each having a projecting pin 96 thereon which projects outwardly therefrom and extend under the tapered arms of the L-shaped arms 90. The two cam wheels 94 are mounted on shaft 97 driven from a gear box 98 mounted on one of the members 66. The gear box 98 is driven by an electric motor 100 through a belt drive 102 thus providing a drive for the cam wheels 94 whereby the top platen 44 may be elevated away from the bottom platen 46 when the cam wheels 94 are rotated. For each complete revolution of the cam wheels 94, the top platen 46 will be elevated and lowered. The mold opening and closing can be operated by an air or hydraulic system or by a suitable electric system but as disclosed a mechanical system operates effectively. The motor 100 is of the heavy-duty type and is connected to a heavy-duty low reduction gear box 98. The details of the control mechanism are not particularly significant since other control systems may be employed. However, in an exemplary control system, a cam (not shown) may be provided for rotation by the motor 100 and will sequentially engage a plurality of micro-switches during a 360° rotation of the shaft. After maximum forward travel of the press 10, a limit switch 103 is engaged by an arm 104 on the press which starts the motor 100 and opens the mold. As the cam contacts the first micro-switch for return of the press toward the supply apparatus, three simultaneous actions take place. A pin 106 which engages a drive chain 108 is released thus enabling the chain 108 to run freely. Chain 108 is continuously driven when the main switch is on. At the same time, an electric motor which drives a return chain 110 is energized. The chain 110 is permanently fastened to the frame of the press so that the press 10 will move with the chain 110 and vice versa. Also, a clutch on the chain 110 is engaged for returning the press toward the supply apparatus. As the press returns, the cam will engage the second micro-switch thereby stopping the motor 100 with the mold in the open position. The press has an arm 109 thereon which enclose a return limit switch 111 which introduces four simultaneous actions, namely, the return motor is shut-off, the clutch connecting the return motor to the chain 110 is released, the pin 106 is engaged with the chain 108 and the motor 100 starts. The mold then closes and micro-switch three is contacted which stops motor 100 leaving the mold in closed position and ready for movement away from the supply apparatus toward the discharge cletrac mechanism.

The present invention has several novel features which produce a highly desirable product. The particular system of reducing moisture and air by heating the glass mat in advance of impregnation provides a decided improvement by reducing the problem of air trapped in the laminate. Also, evacuating air from the liquid resin system by a vacuum pump provides a constantly recycling resin system having a continuous vacuum on the resin maintained in the resin supply tank. Also, the resin is prevented from running over the edges of the cellophane by using a roll fed absorbent paper along both side edges thereof and the molded sheets will have uniform thickness by using stops placed along the sides of the mold.

The press can be used in molding any size sheets ordinarily not practical in a continuous operation and also for molding relatively thick sheets. The direct contact of the plastic sheets with the mold provides for relatively short molding cycles. Also, the press can mold sheets of various contours continuously by using suitably shaped molds. For example, a corrugated sheet may be readily molded by using a corrugated platen. The use of screened or grooved rolls for impregnation will prevent the wet glass mat from sticking to the rolls and also allows the air to escape from the glass mat. Also, the mold may be employed for laminating or bonding two dissimilar materials such as metal to plastic and the recoil type mechanism is provided for supporting the sandwich structure in transfer from the squeeze rolls to the press thereby retaining the laminate sheet in supported condition while the press moves outwardly away from the squeeze roller and then returns back toward the squeeze roller.

In FIGURE 2, there is illustrated the structure of a spring wound roller 120 which carries a canvas sheet or other similar sheet and which will unroll automatically as the press moves away from the squeeze rolls thus supporting the laminate sheet between the squeeze roll and the press.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention as claimed.

What is claimed as new is as follows:

1. The method of forming a continuous laminate sheet consisting of the steps of heating a glass fiber mat for removing moisture from any pockets therein and heating the air in any pockets therein, impregnating the heated mat with resin, subjecting one surface of the heated mat to a vacuum for removing air therefrom to provide thorough impregnation, allowing the heated mat to cool whereby contraction of air in the air pockets in the mat will cause further impregnation of the resin, applying a bottom and top film to the glass mat, and squeezing the films and mat without setting the resin thereby forming a laminate sheet, molding an increment of the laminate sheet by concurrently applying heat and pressure thereto while conveying the continuous laminate sheet longitudinally, releasing the molded increment of the laminate sheet, maintaining tension thereon by engagement with the end of the molded increment remote from the squeezing station, and molding a subsequent increment of the continuous laminate sheet by concurrently applying heat and pressure thereto while conveying the continuous laminate sheet longitudinally thereby molding the sheet in a step-by-step continuous procedure.

2. An apparatus for molding a laminated sheet comprising a framework, a top and bottom platen mounted on said framework, means for moving the platens in relation to each other for compressing a laminate sheet therebetween, heating means associated with at least one of said platens for heating a laminate sheet therebetween, supply means associated with one edge of said platens for supplying a laminate sheet therebetween for molding, said supply means comprising a glass mat supply roll for supplying a glass mat, a top film supply roll, a bottom film supply roll for supplying top and bottom films to the glass mat, squpeeze rollers engaging the top and bottom surfaces of the top and bottom films for squeezing the films and mat together, means applying liquid resin to the glass mat prior to entry thereof between the films, means heating the glass mat prior to application of liquid resin for removing moisture therefrom, a squaaze roller engaging the glass mat for inducing a vacuum in the area of the glass mat for removing air therefrom for more thorough impregnation of the liquid resin in the glass mat whereby cooling of the glass mat together with the vacuum will thoroughly impregnate the resin into the glass mat and eliminate voids, said framework is movably supported for longitudinal movement in relation to the laminate sheet during the molding operation, said squeeze rollers being mounted on a stationary support member, a spring biased roller carried by the framework and including a supporting sheet wound thereon having one end anchored to the stationary support for the squeeze rollers whereby the laminate sheet will be supported during movement of the framework from a position adjacent the squeeze rollers to a position remote therefrom, and means at the remote position of the framework for engaging the end of the molded sheet for holding it in place during return movement of the framework to engage a subsequent increment of the laminate sheet.

References Cited

UNITED STATES PATENTS

| | | | |
|---|---|---|---|
| 3,050,109 | 8/1962 | Monaco | 156—324 XR |
| Re. 24,804 | 3/1960 | Shorts | 156—276 X |
| 927,123 | 7/1909 | Custer | 214—6 |
| 2,051,011 | 8/1936 | Smith | 18—19 |
| 2,967,328 | 1/1961 | Shelby et al. | 18—19 |
| 2,550,465 | 4/1951 | Gorski | 154—44 |
| 2,224,992 | 12/1940 | Sutherland | 156—580 X |
| 2,523,410 | 9/1950 | Allard. | |

EARL M. BERGERT, *Primary Examiner.*

J. J. BURNS, D. S. SCHWARTZ, R. A. KILLWORTH,
*Assistant Examiners.*